UNITED STATES PATENT OFFICE.

TOM SIDNEY MOORE, OF EGHAM HILL, ENGLAND.

REDUCTION OF SUBSTITUTED NITRO COMPOUNDS, NITROSO AND AZO COMPOUNDS, OR THE LIKE.

1,358,324.  Specification of Letters Patent.  Patented Nov. 9, 1920.

No Drawing.  Application filed July 26, 1920. Serial No. 399,119.

*To all whom it may concern:*

Be it known that I, TOM SIDNEY MOORE, subject of the King of Great Britain, residing at Egham Hill, Surrey, England, have invented certain new and useful Improvements in and Relating to the Reduction of Substituted Nitro Compounds, Nitroso and Azo Compounds, or the like, of which the following is a specification.

This invention relates to improvements in the reduction of substituted nitro compounds (except nitrophenolbenzylethers), nitroso and azo compounds. Although many methods have been proposed for this purpose, the usual commercial method is to employ iron borings and a small quantity of hydrochloric acid, for instance one fortieth of the theoretically necessary amount. Even this small amount of acid is sufficient in many cases to cause side reactions or to discolor the reduction product. The object of this invention is to obviate this difficulty by providing a satisfactory process which at the same time will be cheap and effective.

According to my invention I effect the reduction of such compounds (excluding nitrobenzene and nitrophenolbenzylethers) by means of cast iron in the form of borings, in conjunction with an aqueous solution of chlorid instead of acid; in some cases I may combine this treatment with a treatment by sulfureted hydrogen.

The chlorid I prefer to employ is calcium chlorid but I can also use sodium chlorid, and some of the advantages of the invention can be obtained by employing ferrous chlorid. Each chlorid exhibits peculiarities as will be described.

Sodium chlorid in aqueous solution effects slow reduction when used with cast iron, but owing to the neutrality of the solution, a very good product is obtained.

It has been proposed to reduce nitrophenolbenzylethers by heating with iron filings and a concentrated solution of common salt after which the insoluble reduction product is separated from the iron used by the extraction with benzene. When preparing bases which are soluble in water, I find that the use of calcium chlorid has the additional advantage that the hydrochlorid of the base can be prepared by precipitation of the solution of the base with hydrochloric acid; in this stage of the process, calcium chlorid is not precipitated, whereas if a strong solution of sodium chlorid is employed, the greater part of the sodium chlorid is precipitated with the hydrochlorid of the base.

Calcium chlorid in aqueous solution with cast iron effects reduction about four times as fast as sodium chlorid in the cases tested, but the quality of the product, though sufficiently good for almost all purposes, is not quite so high as in the previous case. The reaction is very slow when using wrought iron. In this connection I may refer to the fact that Wohl (*Berichte* 1894 pp. 1432 and 1815) mentions that iron (eisenpulver or feingepulverter eisen) reduces nitrobenzene to anilin in alcoholic solution or hot aqueous solution in presence of calcium or magnesium chlorid and mentions that the absence of acid is an advantage. The use of alcohol is of course most undesirable for technical purposes and I find that if the alcohol is omitted, and the nitrobenzene treated with cast iron borings in presence of an aqueous solution of calcium chlorid, the reaction is slow, whereas in the case of the hereafter described substituted nitro compounds, it is rapid.

An aqueous solution of ferrous chlorid in presence of cast iron reduces rather faster than a solution of calcium chlorid, but the acidity due to hydrolysis in many cases affects the quality of the product. I am aware that Cain (*Intermediate Products for Dyes*, 1918 p. 86) in describing the old process with iron and hydrochloric acid, mentions that the iron and acid may be stirred and boiled and p. nitranilin gradually added, but it is not stated that all the hydrochloric acid is to be decomposed before adding the p. nitranilin and later in the process more acid is added, so that this process would not lead to the same result as my process in which free acid (other than hydrolytic acidity) is avoided throughout.

In some cases it is advisable to supplement or follow the reduction by iron and a chlorid with reduction by sulfureted hydrogen.

My experiments so far have been mainly performed with p. nitrosophenol, p. nitrophenol, o. nitrophenol, p. nitranilin, o. nitranilin, p. nitroacetanilid, o. nitroacetanilid, and the sodium salts of 2. nitro. 4. aminobenzene sulfonic acid and p. hydroxyazobenzene. p. sulfonic acid. For the sake of a convenient generic designation, compounds of this general character are hereinafter termed aromatic nitrogen compounds containing an aromatic nucleus and at least one substituent other than a nitro-group.

When performing the reduction with the aid of calcium chlorid, the calcium may be removed from solution at the end of the reduction by precipitation, or the liquor may be filtered and crystallized and the mother liquor worked up by being used to reduce further material with iron.

*Example 1.*

Preparation of p. aminophenol by reduction of p. nitrosophenol.

The best method hitherto published for the reduction of hydroxy-nitroso compounds is to pass a rapid stream of sulfureted hydrogen through an ammoniacal solution of the nitroso compound. The use of iron and hydrochloric acid leads to the formation of highly colored products. On shaking or stirring p. nitrosophenol with iron and a dilute solution of calcium chlorid, the solution becomes warm and after a short time is colorless. The experiments that gave the best results were carried out as follows:

(1) If working for p. aminophenol hydrochlorid.

1 part of p. nitrosophenol is added gradually to 15 parts of a 1% solution of crystalline calcium chlorid ($CaCl_2.6H_2O$) which is being stirred with 4 parts of coarse cast iron borings, the temperature being at the start 30° C.; if under the circumstances, the reaction does not proceed sufficiently quickly, crushed iron borings or filings are added (1 part). Heat is given out and external cooling should be used to keep the temperature below 40° C.—which temperature it is best not to exceed, unless the amount of iron present and the extent of agitation are such that the reduction proceeds rapidly and the p. nitrosophenol is added in small quantities so that each portion is reduced before the next is added. When all the color of the p. nitrosophenol has disappeared, the temperature is raised to boiling point and kept there for about ten minutes. The solution is then allowed to stand while the sludge settles being kept hot the whole time. It is then filtered the sludge is boiled out three times with water, the first washing being added to the main mother liquor and the last two being collected separately.

The p. aminophenol deposited from the mother liquor after cooling is filtered off, and the mother liquor put back into the reducing vessel (which still contains the residual iron) with one part of crushed cast iron borings or filings and successive batches reduced in the same way. The sludge washings are added at any convenient point and the boiling after reduction continued long enough to reduce the volume to the original volume.

The crude p. aminophenol is dissolved in the theoretical amount of strong hydrochloric acid diluted with its own volume of water, warmed to dissolve all the p. animophenol hydrochlorid and filtered through animal charcoal. The solution is evaporated until solid begins to separate and a further quantity of strong hydrochloric acid equal in amount to that used before, added to the hot solution. The p. aminophenol hydrochlorid that separates out on cooling is filtered and washed with concentrated hydrochloric acid. The acid mother liquor and washings, diluted with their own volume of water are used to dissolve the next batch of p. aminophenol.

(2) If working for p. aminophenol.

The process is the same as the first part of (1) up to the filtration of the sludge after reduction. But after filtration from the sludge, the still hot liquid is filtered through animal charcoal. The p. aminophenol separates from the mother liquor on cooling as almost white crystals which are light brown by the time they are filtered off.

The quality of the product improves the less the solution is exposed to air during reduction, filtration and crystallization.

Sulfureted hydrogen can be used as in Example 2 after the color of the p. nitrosophenol has been discharged, but there appears to be very little, if any, advantage in this.

*Example 2.*

Reduction of o. nitranilin to o. phenylene diamin.

1 part of o. nitranilin is added in three or four separate portions to three parts of crushed cast iron borings and 20 parts of a 2% solution of calcuim chlorid ($CaCl_2.6H_2O$) at a temperature of 80° to 100° C., the whole being stirred vigorously and a slow current of sulfureted hydrogen being passed through at the same time. After reduction, which is complete in 1 to 1½ hours time, the solution is filtered from the iron sludge into dilute hydrochloric acid, the sludge being boiled out as usual and the washings added to the main solution. On evaporation a very good specimen of the o. phenylene diamin hydrochlorid is obtained with a yield of 83% thereoretical. The hydrochlorid is slightly pink and gives with caustic soda an almost white specimen of o. phenylene diamin of correct melting point.

The o. phenylene diamin prepared in this way preserves its color on exposure to air better than any other specimen examined.

*Example 3.*

Reduction of p. nitroacetanilid to p. aminoacetanilid (c. f. Cain p. 87).

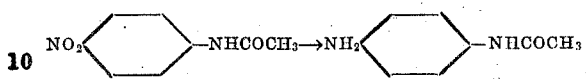

According to published methods of manufacture p. nitroacetanilid is heated with iron borings and dilute acetic acid until reduction is complete, and the product suitably purified.

According to the present invention, on the other hand, cast iron in the presence of calcium chlorid reduces p. nitroacetanilid quickly giving a practically theoretical yield of a very good product.

1 part powdered p. nitroacetanilid
2 parts crushed iron turnings
14 parts of a 1.5% solution of calcium chlorid ($CaCl_2.6H_2O$)

are stirred together and kept nearly at boiling point until all the p. nitroacetanilid (which is sparingly soluble, even in boiling water) has disappeared. There is a tendency for the p. nitroacetanilid, mixed with iron sludge produced in the reduction, to accumulate at the top of the liquid and the stirring arrangement must be such as to mix this top layer with the liquid. The reduction takes about an hour. The liquid is allowed to settle a few minutes and is filtered, if necessary through animal charcoal. The mother liquor deposits almost white p. aminoacetanilid, which becomes slightly pink on keeping. Successive reductions in the same mother liquor are then carried out as described in previous cases. In this case, since evaporation takes place during reduction, no separate boiling down of mother liquor is necessary. The color of the second and subsequent batches is usually even better than that of the first, and the average yield after the first batch is 97% of theoretical. After five reductions, the amount of calcium chlorid present in the mother liquor was found to be 65% of that originally taken.

If, as is often the case, the solution of p. aminoacetanilid is used as such, the yield can be taken to be theoretical.

*Example 4.*

Reduction of the sodium salt of p. hydroxyazobenzene-p. sulfonic acid to p. aminophenol and sodium sulfanilate.

1 part of the sodium salt $NaSO_3.C_6H_4.N_2.C_6H_4OH$
1 part of cast iron borings or turnings
7½ parts of a 5% solution of sodium chlorid are stirred and heated to boiling until all yellow color is discharged from solution. A small quantity of sodium carbonate is added and the solution boiled a further few minutes and filtered. If a small quantity of sodium sulfite is added just before the filtration, less oxidation by the air takes place and the color of the product is better. The solution on cooling deposits p. aminophenol, which is filtered off and washed with small quantities of cold water, the washings being added to the mother liquor. The mother liquor is then acidified with strong hydrochloric acid and the sulfanilic acid which separates out filtered and washed. The filtrate is now mixed with the washings from the iron sludge and boiled down to the original volume. It is then exactly neutralized with sodium carbonate or caustic soda, and a further batch of azo-compond reduced in it.

In the fifth and subsequent reductions, considerable quantities of sodium sulfanilate separate out with the p. aminophenol, but these can be readily separated by washing with water. Also sodium chlorid separates out with the sulfanilic acid, but can be easily washed out. Average yield of p. aminophenol after the first batch is 80% of theoretical.

The commercial applicability of the process to other nitroazo or nitroso compounds must be determined by a test reduction since I find that certain compounds, e. g., m. nitranilin (as distinguished from o. nitranilin) do not give such satisfactory results when treated as above described.

The reaction is of particular value when the product is soluble in water as in the case of p. aminophenol, o. aminophenol, and p. phenylenediamin. In this case it is possible to operate continuously by successive reduction of batches in the same mother liquor. But broadly speaking the invention is valuable with almost any simple nitro, nitroso, azo or the like body; nitrobenzene is not included however.

I declare that what I claim is:

1. The process of rapidly reducing aromatic nitrogen compounds containing an aromatic nucleus, and at least one substituent other than a nitro-group, which comprises effecting the reduction with the aid of cast iron in relatively coarsely divided form, as distinguished from ferrum-redactum, in conjunction with an aqueous solution of a chlorid.

2. The process as set forth in claim 1, in which an aqueous solution of calcium chlorid is employed.

3. The process as set forth in claim 2, in which the hydrochlorid of a water-soluble base is prepared by adding hydrochloric acid to the solution containing the base and the calcium chlorid.

4. The process of rapidly reducing aromatic nitrogen compounds containing an aromatic nucleus and at least one substituent other than a nitro-group, which comprises effecting the reduction with the aid of cast iron borings, in conjunction with an aqueous solution of a chlorid.

5. The process as set forth in claim 4, in which an aqueous solution of calcium chlorid is employed.

6. The process as set forth in claim 5, in which the hydrochlorid of a water-soluble base is prepared by adding hydrochloric acid to the solution containing the base and the calcium chlorid.

In witness whereof I have hereunto signed my name this 9th day of July, 1920, in the presence of two subscribing witnesses.

TOM SIDNEY MOORE.

Witnesses:
HAROLD E. POTTS,
W. H. BEESTON.